J. T. Kimbel,
Double-Acting Pump.
No. 70,443. Patented Nov. 5, 1867.

Witnesses.

Inventor
John T. Kimbel

United States Patent Office.

JOHN T. KIMBEL, OF VERNON, INDIANA.

Letters Patent No. 70,443, dated November 5, 1867.

IMPROVEMENT IN PUMPS.

*The Schedule referred to in these Letters Patent and making part of the same.*

TO ALL WHOM IT MAY CONCERN:

Be it known that I, JOHN T. KIMBEL, of Vernon, in the county of Jennings, and State of State of Indiana, have invented a new and useful Improved Sucker and Force-Pump; and I do hereby declare that the following is a clear and exact description of the construction and operation of the same, reference being had to the annexed drawings, making a part of this specification, in which—

Figure 1:
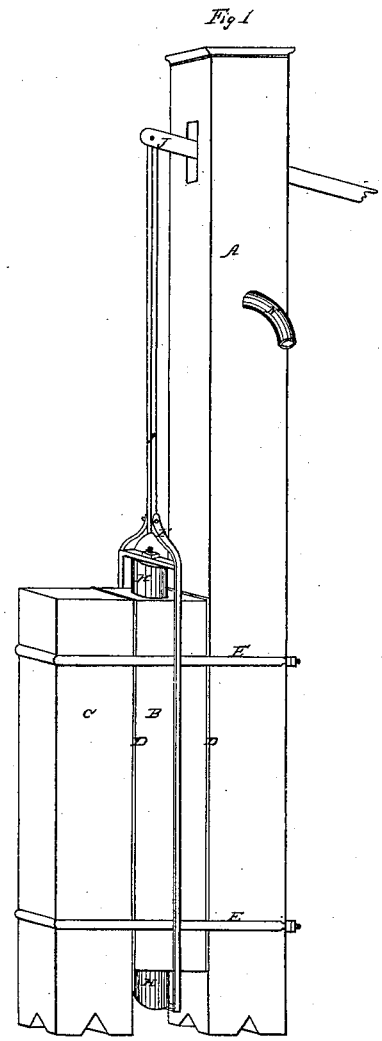
Figure 2:
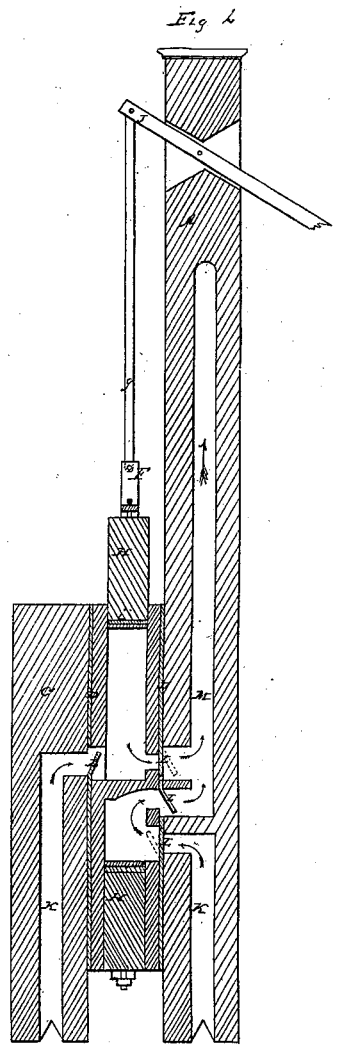

Figure 1 is a perspective view—

A representing the main stalk or pipe; N, spout or outlet for the water; B, cylinder, made with a partition in centre, so as to form a double cylinder; C, side section of the stalk, through which the upper end of cylinder B is supplied with water; D D, packing and valves between the cylinder B and stalks A and C; E E, bands or clamps, holding A, B, and C together; F, clevis or shackle, to which the plungers H H are attached, as seen in fig. 1; G, rod connecting clevis F to handle J; I I, suckers, attached to plungers H H by a rod or bolt running through their centres and through plungers H H, and fastened with a nut at top and bottom of clevis F; K K, water-channels in stalk C and A; L L L L, valves working between or in cylinder B and stalks A and C; M, water-channel in main stalk, leading to top of the well, through which the water is forced.

On the downward movement of the rod G the lower sucker I draws its supply of water through the valve L, between cylinder B and stalk A', through channel K. At same time the upper plunger, H, is forcing water through the valve L into water-channel M in main stalk A, at same time closing the valve L on water-channel K in stalk C. On the upward movement of rod G the lower plunger, H, forces the water out of lower end of cylinder B, through centre valve L, into water-channel M in main stalk A, at same time closing the lower valve L on water-channel K in lower end of stalk A. At the same time the upper sucker, I, attached to plunger H, takes its supply from stalk C, through valve L on channel K.

I claim the combination and arrangement of the two solid pistons, H H, and the cylinders in which they work, with the ways and valves L L, and supplying and discharge pipes, all substantially as described.

JOHN T. KIMBEL.

Witnesses:
JAMES KIMBEL,
C. H. GREEN.